(12) United States Patent
Sakaguchi

(10) Patent No.: US 6,810,359 B2
(45) Date of Patent: Oct. 26, 2004

(54) MAINTENANCE AND MANAGEMENT METHOD OF EQUIPMENT FOR PRODUCTION OPERATIONS AND SUPPORT SYSTEM THEREFOR

(75) Inventor: Mitsuo Sakaguchi, Kariya (JP)

(73) Assignee: Japan Institute of Plant Maintenance, Tokyo (JP)

( * ) Notice: Subject to any disclaimer, the term of this patent is extended or adjusted under 35 U.S.C. 154(b) by 368 days.

(21) Appl. No.: 09/999,801

(22) Filed: Oct. 31, 2001

(65) Prior Publication Data

US 2002/0091500 A1 Jul. 11, 2002

(30) Foreign Application Priority Data

Nov. 7, 2000 (JP) ...................................... 2000-339154

(51) Int. Cl.[7] .......................... G06F 19/00; G06F 11/30
(52) U.S. Cl. .......................... 702/182; 702/84; 702/184
(58) Field of Search ................................ 702/182, 183, 702/184, 185, 177, 84; 700/174, 175; 705/7, 11

(56) References Cited

U.S. PATENT DOCUMENTS

| | | | |
|---|---|---|---|
| 6,006,171 A | * | 12/1999 | Vines et al. ................. 702/184 |
| 6,442,511 B1 | * | 8/2002 | Sarangapani et al. ........ 702/194 |
| 6,591,157 B1 | * | 7/2003 | Vivirito et al. ............. 700/175 |
| 2003/0004765 A1 | * | 1/2003 | Wiegand ........................ 705/7 |
| 2003/0065522 A1 | * | 4/2003 | Wepfer et al. ................. 705/1 |

OTHER PUBLICATIONS

*Maximizing Production Effectiveness*, TPM In Process Industries, Edited by Tokutaro Suzuki, 1994, pp. 22–31.
*Implementation of Jishu–Hozen Activities*, TPM Total Productive Maintenance, New Implementation Program in Fabrication and Assembly Industries, Edited by Kunio Shirose, 1996, pp. 52–57 & 208–262.

* cited by examiner

*Primary Examiner*—Patrick J Assouad
(74) *Attorney, Agent, or Firm*—Flynn, Thiel, Boutell & Tanis, P.C.

(57) ABSTRACT

A maintenance and management method of equipment for production operations, comprising: obtaining machinery component defect data by inspecting the equipment; performing countermeasures and inspections based on these data; obtaining defect frequency data and inspection standards data, classifying the defects of the equipment by importance; repeating an overall inspection based on the defect frequency data until the defect frequency data of all defect locations have lowered to a standard value or lower; then, producing operating standards data based on inspection standards data; and performing maintenance and management by individually feeding back the operating standards data to each operator, and a maintenance and management support system used for performing the method. The above maintenance and management method changes the forced deterioration of equipment to natural deterioration and standardizes the skill and knowledge level of each operator about the production machinery. Therefore, the service life of machinery components is extended and the time and cost necessary for maintenance and management can be reduced.

1 Claim, 2 Drawing Sheets

MAINTENANCE AND MANAGEMENT METHOD OF EQUIPMENT FOR PRODUCTION OPERATIONS AND SUPPORT SYSTEM THEREFOR

BACKGROUND OF THE INVENTION

1. Field of the Invention

The present invention relates to the maintenance and management of equipment for production operations, and more particularly, to a maintenance and management method and a maintenance and management support system for the management by an operator for production operations using maintenance and management data that have been collected by an original method.

2. Description of the Prior Art

Conventionally, inspections, maintenance and operation of production machinery for the production industry are mostly based on proprietary manuals on the production machinery, and after having installed the production machinery into the production line, inspection and maintenance become problematic due to the interaction with other machinery. As there is no clear guidance on how to deal with this problem, and furthermore, the level of knowledge and maintenance skills of each operator regarding the production machinery differ, maintenance and management of equipment is often handled by repeated trial and error.

Furthermore, often a corrective maintenance approach is taken (i.e. maintenance is carried out only after an accident or a defect has occurred), without active maintenance and management and without setting clear maintenance periods for the production machinery. Therefore, the operators do not subject the production machinery to measures that have to be taken in the natural course of events, which leads to an acceleration of the deterioration of the devices due to deterioration (hereinafter, referred to as "forced deterioration"), thereby resulting in a shortened service life.

SUMMARY OF THE INVENTION

It is a first object of the present invention to prevent the conventional repeating of trial and error, to let operators of any level of knowledge and maintenance skills accurately grasp defects regarding the equipment, and standardize the skill level of operators.

It is a second object to make the maintenance, management and operation of equipment easy, fast and reliable, as well as to switch the forced deterioration of equipment to a deterioration occurring in line even with basic conditions (cleaning, lubrication and retightening) and even under correct usage (hereinafter, referred to as "natural deterioration"), and keep up this natural deterioration.

As described below, the first object is attained by performing maintenance and management comprising obtaining defect frequency data and inspection data that are divided by importance of the level of defect of the production machinery (i.e., depending on how serious the level of the defect of the production machinery is), after obtaining machinery defect data by letting randomly sampled operators using equipment inspect a series of production machines and carrying out countermeasures and inspection based on these data, and repeating an overall inspection based on the defect frequency data until the defect frequency data for all defect locations have been lowered to a standard value, then producing operating standards data based on these inspection data, and individually feeding back the operating standards data to each operator.

In order to perform the above-stated method even faster, there is provided a maintenance and management support system of equipment for production operations comprising a means for storing machinery component defect data that has been obtained by inspecting the equipment in a storage device using an input device, a means for additionally storing in the storage device result data of countermeasures performed based on these machinery component defect data, a means for additionally storing in the storage device inspection standards data and defect frequency data obtained thereafter by inspection, a means for performing a countermeasure on locations with high defect frequency that have been obtained from the defect frequency data, and repeatedly performing an overall inspection until the defect frequency parameters of all locations have been lowered to a standard value, and a means for individually feeding back the stored inspection standards data to each operator by outputting them from the storage device via a processing device as operating standards data on an output device.

DETAILED DESCRIPTION OF THE PREFERRED EMBODIMENTS

The following is a detailed explanation of the maintenance and management method of the present invention. In order to improve the production efficiency in production operations, it is necessary to reduce all causes obstructing the production to a minimum.

Moreover, it is important to increase the production efficiency in the production operation by improving the level of knowledge and maintenance skills of each operator involved in the production operation and standardizing the level of the operator.

In order to achieve this, the present invention introduces the concept of "autonomous maintenance and management", and is configured on this basis.

Here, "autonomous maintenance and management" means a management method, in which the operator using the equipment performs maintenance activities such as cleaning, lubrication, retightening and inspections, and by thoroughly eliminating all defects and problems standing in the way of the equipment's enhanced productivity, the equipment is restored to or maintained at a state that is closed to its initial state, while the maintenance and management skills of the operators themselves are standardized and are improved.

Figure 1:
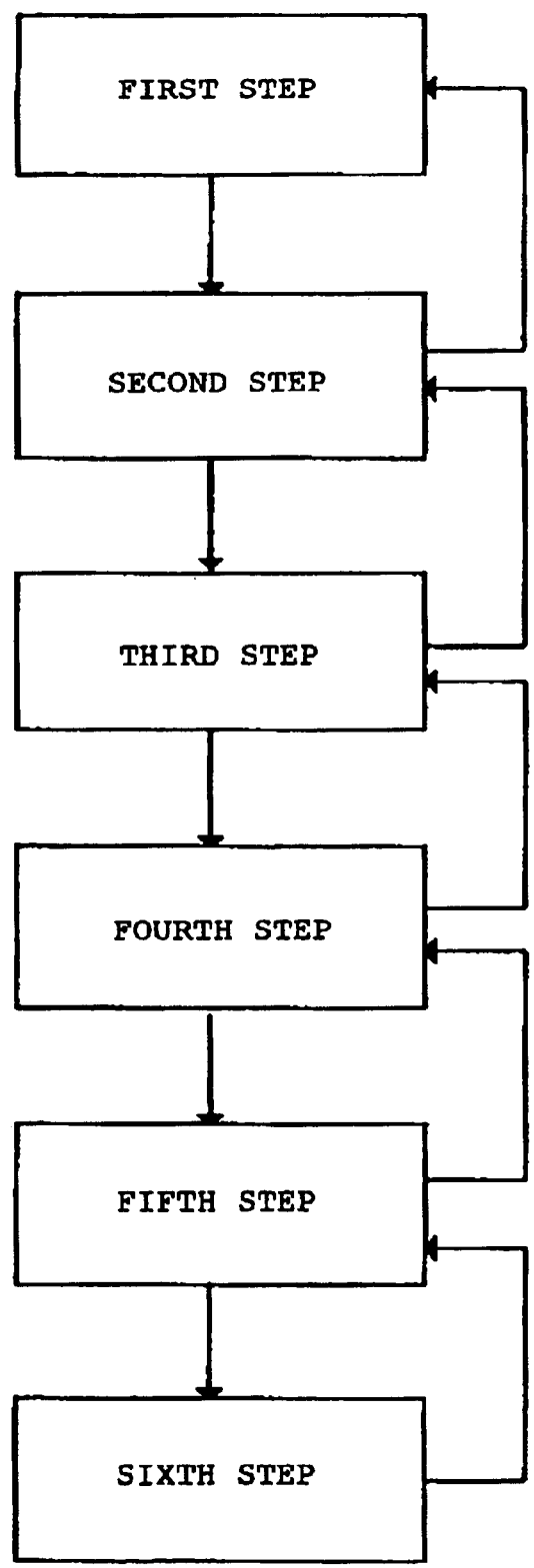
FIG. 1 is a flowchart illustrating, in chronological order, the management approach of equipment to be maintained in accordance with the present invention.

In order to perform this "autonomous maintenance and management" rationally, all operators produce maintenance and management data, and the most efficient are the following methods (1) to (4), in which the maintenance and management is based on these data. Referring to FIG. 1, the following is a detailed explanation of the steps (1) to (4).

(1) Discovery of a defect by initial cleaning and rectification of the defect (first step in FIG. 1):

The plant operators discover an equipment defect by handling the equipment. Then, the defect location and the defect item are listed, and machine component defect data are prepared.

Here, "defect location" refers to the components constituting the production machinery, for example components such as control panel, compressor and pipework. "Defect item", on the other hand, states the defects occurring with regard to these components, and includes not only breakdown and abnormal noise, but also minor defects such as contamination or loosening of bolts and nuts. Depending on the type of machine, more than several hundred items may be found.

(2) Countermeasures against defect sources of dust and contamination and countermeasures against locations hard to access for inspection (hereinafter, hard-to-inspect locations) (FIG. 1, second step):

Then, maintenance and management of the equipment is carried out by eliminating forced deterioration due to unremoved dust and contamination, vibrations, temperature differences, etc.

For this, the operators clean and inspect the production machinery again and examine the sources of dust and contamination, based on the machinery component defect data produced by each plant operator in the first step.

Then, the improvement measure against the specific defect location is implemented based on the results of the second step.

For example, it is possible to employ such countermeasures as arranging a local cover over places where dust tends to be generated, or to specify the location where oil is leaking and to seal the defect location.

The data of the results of the specific countermeasures taken for each item are added to the above-mentioned machinery component defect data. This can be done for example by writing a mark that a new countermeasure has been completed in addition to the mark showing the occurrence of a defect on the machinery component defect data sheet.

Regarding newly discovered defects, defect location and defect item are successively added to the machinery component defect data prepared in the first step. Suitable countermeasures are also implemented with regard to these defect locations.

(3) Preparation of defect frequency data and inspection standards data (FIG. 1, third step):

Based on the machinery component defect data to which the marks for countermeasure completion have been added, the operators actually perform their daily chores such as cleaning, lubrication and inspection. The time that the operators need for the actual works of cleaning etc. is measured, and inspection standards data are produced.

These inspection standards data are the data relating to time dedicated to cleaning as well as the cleaning periods. Whether the cleaning times and cleaning periods can be performed simply within the time that has been allotted for routine inspection is measured from a comprehensive viewpoint. This is because with regard to the actual inspection, it is necessary that certain inspection items are arranged in the order of the working day and daily inspection are habitualized.

Regarding items that occur with high defect frequency even after the countermeasures of (2) have been taken, defect frequency data are configured by setting appropriate parameters. The inspection standards data and the defect frequency data are recorded as additional data to the machinery component defect data.

(4) Overall inspection (FIG. 1, fourth step):

Evaluating the defect frequency data clarifies the technological weak points of the machinery elements. That is to say, by comparing the parameters that have been set for the various defect locations, the locations of the production machinery at which defects tend to occur as well as their importance and the operators' technical skill and knowledge level regarding the machine elements become clear.

In order to overcome these weaknesses, operating standards data are prepared, which include the inspection item, inspection method, inspection time and inspection period for each process.

"Operating standards data" are the data that are obtained by processing the data obtained in the first to third step, such as yearly calendars in which the inspection periods have been specified or the data listing only locations of low technological skill and knowledge of each operator.

Through these works, it is possible to clarify the extent of the basic knowledge about the equipment that the operators should have, to confirm the level of understanding regarding the basic knowledge, and to easily discover irregularities and abnormal symptoms.

If, as the result of the overall inspection, the cleaning times and cleaning periods have to be changed, the procedure returns to the third step, the inspection standards data is rewritten, and also the defect frequency data are rewritten.

The following explains the configuration of a maintenance and management support system in accordance with the present invention.

In order to improve the production efficiency in production operations, it is important to improve the profitability by reducing the maintenance costs and equipment costs for corporate activities, which is achieved by reducing the labor and time for production management.

To achieve this, and to solve the above-stated problem, the present invention is configured by a system using a computer to input and process various kinds of data obtained in three steps. This is explained in detail with reference to FIG. 2.

(1) Input of machinery component defect data 1:

When a plant operator handles equipment and discovers a defect of the equipment, he stores the machinery component defect data 1, which have been prepared from the collected results, in a storage device, such as a mainframe computer or a personal computer. The machinery component defect data 1 are made up of defect location and defect item.

(2) Input of countermeasure result data:

Then, the machinery component defect data 1 are evaluated, and if there is a defect, a specific countermeasure against this defect is implemented, and using an input device, the item to which a countermeasure has been taken is compared with the machinery component defect data 1 stored in the storage device, and the data are evaluated again. The countermeasure result data are produced repeatedly as the result of the specific countermeasure, until the defect based on the machinery component defect data 1 has disappeared.

(3) Input of the inspection standards data and the defect frequency data:

Then, machinery component defect data 2 obtained by overwriting the produced countermeasure result data are outputted and displayed, and the operators perform the actual cleaning, lubrication, inspection, etc. in accordance with the outputted/displayed data. Furthermore, the operators measure the time needed for the actual works, and produce inspection standards data. These inspection standards data are the data related to the time dedicated to the cleaning and the cleaning period.

Defects such as dust and rust still occur periodically after these countermeasures. Regarding new defects occurring after the above-mentioned countermeasures, the defect frequency is measured, reflected in the defect locations, and the operators set the appropriate parameters. Then, defect frequency data comprising these parameters are produced.

The machinery component defect data 2, to which the defect frequency data and the inspection standards data have been added, are then subjected to a data evaluation.

As a result of the data evaluation, only the locations with high parameters in the defect frequency data of the machinery component defect data 2 are extracted as defect frequency data through the processing device of the computer storing the above-mentioned data and are given out and presented to the operators.

The operators undertake the actual countermeasure based on these defect frequency data, and the items for which the defects have been rectified are compared as inspection completion data with the machinery component defect data 2 to perform another data evaluation. The inspection completion data are produced repeatedly as the result of specific inspections, until a parameter in the defect frequency data of the machinery component defect data 2 has decreased to a standard value.

(4) Production of the operating standards data:

Based on machinery component defect data 3, which have been produced through the above process, operating standards data are produced with a processing device, selecting only the information that each operator needs.

The operating standards data is given out in various forms, in consideration of the maintenance skill and knowledge level of each operator and the production efficiency.

For example, by association with calendar software, it is possible to output the inspection schedule data, which are based on the inspection periods, defect locations and items entered as the inspection standards data, in form of a calendar.

It is also possible to obtain, as operating standards data, an inspection manual that is based on cleaning times, defect frequencies, and defect locations and items.

EXAMPLES

Figure 2:
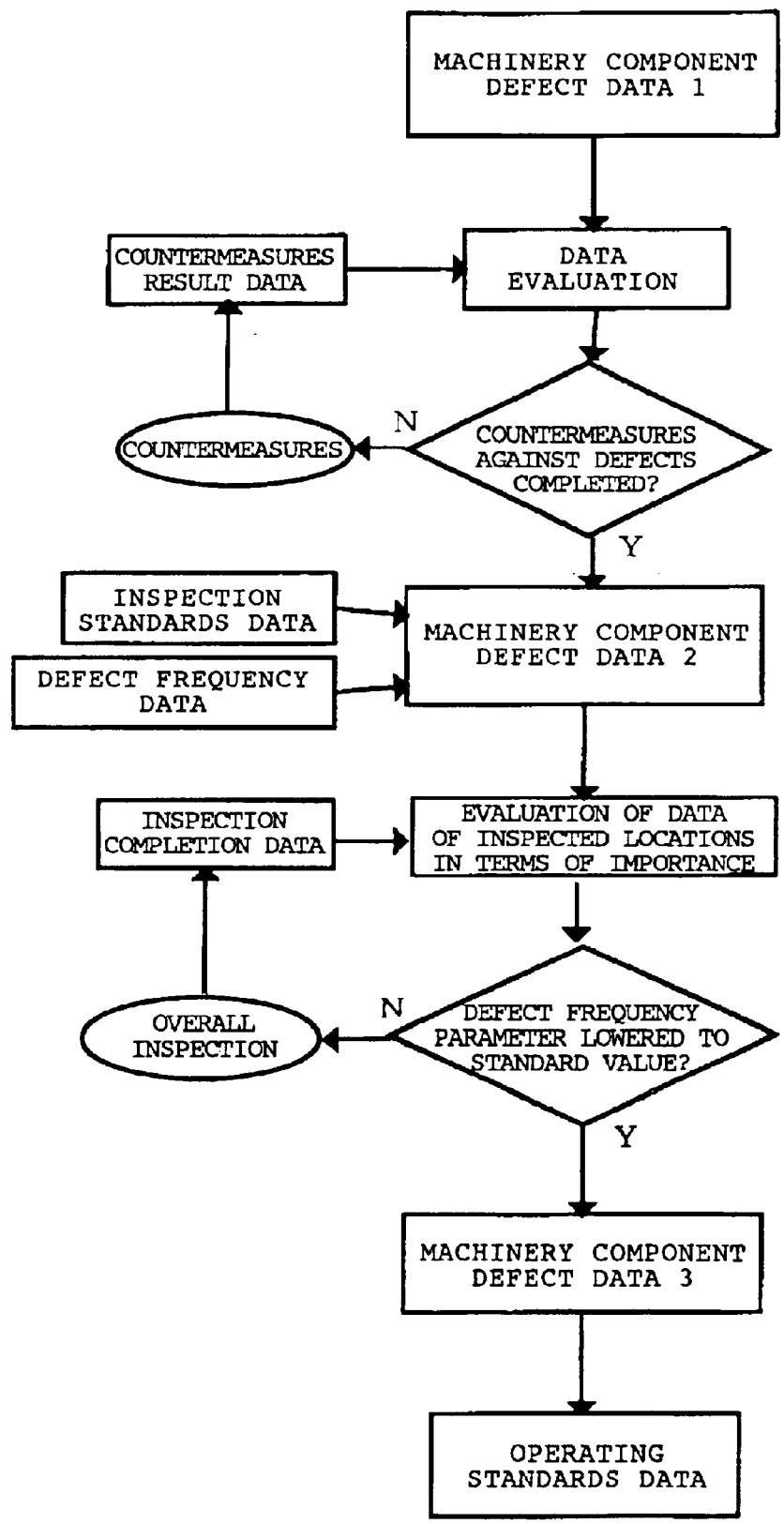
FIG. 2 is a flowchart of the data when a computer or the like is used for the present invention.

Referring to FIG. 1 and FIG. 2, the following is a detailed explanation of an embodiment in which the steps (1) to (4) explained in the above solution are divided into the seven steps (1) initial inspection, (2) countermeasures against defect source and hard-to-inspect inspect location, (3) production of temporary standards for autonomous maintenance, (4) overall inspection, (5) autonomous inspection, (6) standardization, and (7) relentless pursuit of autonomous management.

(1) First step (initial inspection):

In the first step of the maintenance and management in this example, each operator inspects predetermined items on the production machinery managed by the operator.

For example, the inspection is performed by analyzing such items as structural machine elements, hard-to-inspect locations, causes of contamination, quality defects, etc., to find out defects of the production machinery. If there are many items to be inspected, then it is possible to perform later works smoothly and fast by utilizing for example a computer.

The defects found out as a result are collected as the machinery component defect data 1, and in certain cases are stored via an input device as record files of a computer.

Table 1 shows an example of the machinery component defect data 1 obtained in the first step.

TABLE 1

| Defect location | Defect item | | | | | | | |
|---|---|---|---|---|---|---|---|---|
| | Rust | Contamination | Damage | Hole | Vibrations | Generation of heat | Hard-to-inspect location | ... |
| Pump | | V | | | | | | ... |
| Fan | V | | | | | | | ... |
| Compressor | | | | | V | V | | ... |
| Inspection hole | | V | | | | | | ... |
| Hydraulic unit | | | | | | | V | ... |
| : | : | : | : | : | : | : | : | : |

Note: Check (V) shows occurrence of defect.

(2) Second step (countermeasures against defect sources and hard-to-inspect locations):

In the second step of this example, the defects recorded as the machinery component defect data 1, that is, sources of cutting chips etc. occurring during machining of the product, foreign matter mixed into the shipped product, damage, generation of heat, oil leaking from the equipment, etc. are specifically identified, and specific countermeasures for eradicating these defects are taken.

For example, the countermeasure that is taken to suppress the scattering of machinery oil, is to specify the locations in the machine components that are sources of cutting chips, dust etc., and to arrange local covers or seals on these locations. Examples of sources include cutting chips, debris or scale sputter generated when processing components, or foreign matter mixed into the shipped components, oil, water or abrasion powder generated by the equipment, or dust/contamination invading from the external environment.

When the machinery component defect data 1 has been stored in the storage device, then countermeasures against the sources of dust and contamination and countermeasures against hard-to-inspect locations as explained above are performed, based on a data evaluation. These countermeasures are implemented until the defects have been temporarily eliminated completely. After the countermeasures have been finished, the countermeasure result data are produced, and stored in the storage device via the input device.

Table 2 shows an example of the countermeasure result data obtained in the second step.

In Table 2, the items or locations which have been subjected to countermeasures for elimination of the defects are shown with the mark *. Also, in the following tables, the mark * is used to show the items or locations related to the data listed therein.

TABLE 2

| Defect location | Defect item | | | | | | | |
|---|---|---|---|---|---|---|---|---|
| | Rust | Contamination | Damage | Hole | Vibrations | Generation of heat | Hard-to-inspect location | ... |
| Pump | | * | | | | | | ... |
| Fan | * | | | | | | | ... |
| Compressor | | | | | * | * | | ... |
| Inspection hole | | * | | | | | | ... |
| Hydraulic unit | | | | | | | * | ... |
| : | : | : | : | : | : | : | : | : |

If new defects are discovered in the second step, then the procedure returns to the first step, and it may occur that new defects are added to the machinery component defect data 1. In the second step, countermeasures are also taken with respect to the added defects.

(3) Third step (production of temporary standards for autonomous maintenance):

In accordance with the displayed data, the operators add important data regarding the cleaning, lubrication and inspection that have been newly discovered by repeating cleaning, lubrication and inspection. For example, data regarding cleaning times and cleaning periods are added. An example of the inspection standards data obtained in the third step is shown in Table 3, and an example of the defect frequency data is shown in Table 4. Importance is graded to ten levels of 1 to 10 according to the degree of the seriousness of defect in which the greater the number of importance, the more serious the defect becomes.

TABLE 3

| Defect Location | Defect item | | | | | | | | | |
|---|---|---|---|---|---|---|---|---|---|---|
| | Rust | Cleaning time | Cleaning period | Contamination | Cleaning time | Cleaning period | Generation of heat | Cooling time | Cooling period | ... |
| Pump | | | | * | 5 min | 3/W | | | | ... |
| Fan | * | 10 min | 2/M | | | | | | | ... |
| Compressor | | | | | | | * | 20 min | 5/Y | ... |
| Inspection hole | | | | * | 10 min | 1/W | | | | ... |
| Hydraulic unit | | | | * | 15 min | 2/W | | | | ... |
| : | : | | | : | : | | | | : | : |

W: week, M: month, Y: year

TABLE 4

| Defect Location | Defect item | | | | | | | | | |
|---|---|---|---|---|---|---|---|---|---|---|
| | Rust | Freq. | Importance | Contamination | Freq. | Importance | Generation of heat | Freq. | Importance | ... |
| Pump | | | | * | 3/W | 4 | | | | ... |
| Fan | * | 1/M | 5 | | | | | | | ... |
| Compressor | | | | | | | * | 5/Y | 10 | ... |
| Inspection hole | | | | * | 1/W | 1 | | | | ... |
| Hydraulic unit | | | | * | 2/W | 2 | | | | ... |
| : | : | | | : | : | | | | : | : |

W: week, M: month, Y: year

Moreover, based on the machinery component defect data 2, the defect frequency data are shown to each operator with the processing device. An example of these defect frequency data is shown in Table 5.

TABLE 5

| Defect Location | Rust | Freq. | Impor-tance | Contami-nation | Freq. | Impor-tance | Generation of heat | Freq. | Impor-tance | ... |
|---|---|---|---|---|---|---|---|---|---|---|
| Fan | * | 1/M | 5 | | | | | | | ... |
| Compressor | | | | | | | * | 5/Y | 10 | ... |
| Hydraulic unit | | | | * | 2/W | 2 | | | | ... |
| : | | : | | : | : | | | | : | : |

It should be noted that if the defects are not rectified in the third step, then the procedure returns to the second step, the necessary countermeasures are implemented, and if necessary, inspection standards data and defect frequency data are produced.

(4) Fourth step (overall inspection):

In the fourth step of this example, the defect frequency data produced in the third step are given out and presented to each operator with a display device, and an overall inspection based on the defect frequency data is carried out mandatorily by each operator.

Through this work, the scope of the basic knowledge that the operators should have with respect to the equipment becomes clear, the level of understanding regarding the basic knowledge is confirmed, and irregularities or abnormal symptoms can be discovered more easily.

Furthermore, repeating this overall inspection clarifies the operators or the components of the production machinery having a high defect frequency, and the weaknesses of the technology regarding the machinery elements become clear.

The results of the overall inspection are taken as inspection completion, added to the defect frequency data, and subjected to evaluation. Table 6 shows the defect frequency data, to which the inspection completion data have been added.

TABLE 6

| Defect Location | Rust | Freq. | Impor-tance | Inspection completion | Contami-nation | Freq. | Impor-tance | completion of Inspection | ... |
|---|---|---|---|---|---|---|---|---|---|
| Pump | | | | | * | 1/M | 1 | * | |
| Fan | * | 4/Y | 2 | * | | | | | ... |
| Compressor | | | | | | | | | ... |
| Inspection hole | | | | | * | 1/W | 1 | * | |
| Hydraulic unit | | | | | * | 2/M | 1 | * | ... |
| : | : | : | : | : | : | : | : | : | : |

If the result of the evaluation of the defect frequency data is that all defect frequency parameters have been lowered to certain values, then the machinery component defect data 3 based on the machinery component defect data 2 and the inspection completion data is produced.

If in the fourth step the inspection standards data or the defect frequency data have to be changed, then the procedure returns to the third step, and the new data are written into the machinery component defect data 2. The added defect frequency data again become subject to the overall inspection in the fourth step.

(5) Fifth step (autonomous inspection):

Next, routine autonomous inspection is repeated on the basis of the operating standards data that have been extracted from the machinery component defect data 3 and given out.

As shown for example in Table 6, the operating standards data are produced by extracting related items from the machinery component defect data 3, and listing them in a calendar.

If necessary, it is also possible to list only the defect frequencies or only the items to be performed on that day.

Table 7 shows an example of the operating standards data listing the dates and locations to be inspected in calendar form. In Table 7, the horizontal axis denotes the days, and the vertical axis the month.

TABLE 7

| Month | Location | Date | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| 1 | Pump | I | | | I | | | I | | | I | | | I | | | I |
| | Fan | I | | | | | | | | | | | | | | I | |
| | Insp. : | I | | | | | | | I | | | | | | | I | |
| 2 | Pump | | | I | | | I | | | I | | | I | | | I | |
| | Fan | | I | | | | | | | | | | | | | I | |
| | Insp. : | | | | | I | | | | | | | I | | | | |
| 3 | Pump | I | | | I | | | I | | | I | | | I | | | I |
| | Fan | | I | | | | | | | | | | | | | I | |
| | Insp. : | | | | | I | | | | | | | I | | | | |
| 4 | Pump | | | I | | | I | | | I | | | I | | | I | |
| | Fan | | I | | | | | | | | | | | | | I | |
| | Insp. : | | I | | | | | | | | I | | | | | | I |
| 5 | Pump | | | I | | | I | | | I | | | I | | | I | |
| | Fan | | I | | | | | | | | | | | | | I | |
| | Insp. : | | | | | | | I | | | | | | | I | | |
| 6 | Pump | | I | | | I | | | I | | | I | | | I | | |
| | Fan | | I | | | | | | | | | | | | | I | |
| | Insp. : | | | I | | | | | | | | I | | | | | |
| 7 | Pump | | I | | | I | | | I | | | I | | | I | | |
| | Fan | I | | | | | | | | | | | | | | I | |
| | Insp. : | I | | | | | | | I | | | | | | | I | |
| 8 | Pump | I | | | I | | | I | | | I | | | I | | | I |
| | Fan | I | | | | | | | | | | | | | | I | |
| | Insp. : | | | | | I | | | | | | | I | | | | |
| 9 | Pump | | | I | | | I | | | I | | | I | | | I | |
| | Fan | | I | | | | | | | | | | | | | I | |
| | Insp. : | | | I | | | | | | | I | | | | | | I |
| 10 | Pump | | | I | | | I | | | I | | | I | | | I | |
| | Fan | | I | | | | | | | | | | | | | I | |
| | Insp. : | | | | | | | I | | | | | | | I | | |
| 11 | Pump | | I | | | I | | | I | | | I | | | I | | |
| | Fan | | I | | | | | | | | | | | | | I | |
| | Insp. : | | | I | | | | | | | | I | | | | | |
| 12 | Pump | I | | | I | | | I | | | I | | | I | | | I |
| | Fan | I | | | | | | | | | | | | | | I | |
| | Insp. : | I | | | | | | I | | | | | | | | I | |

| Month | Location | Date | | | | | | | | | | | | | | |
|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 |
| 1 | Pump | | | I | | | I | | | I | | | I | | | I |
| | Fan | | | | | | | | | | | | | | | |
| | Insp. : | | | | | | I | | | | | | | I | | |
| 2 | Pump | | | I | | | I | | | I | | I | | | | |
| | Fan | | | | | | | | | | | | | | | |
| | Insp. : | | | | I | | | | | | I | | | | | |
| 3 | Pump | | | I | | | I | | | I | | | I | | | I |
| | Fan | | | | | | | | | | | | | | | |
| | Insp. : | | | | I | | | | | | | I | | | | |
| 4 | Pump | | | I | | | I | | | I | | | I | | I | |
| | Fan | | | | | | | | | | | | | | | |
| | Insp. : | | | | | | | | I | | | | | | | I |

TABLE 7-continued

| | | | | | | | |
|---|---|---|---|---|---|---|---|
| 5 | Pump | I | I | I | I | I | |
| | Fan | | | | | | |
| | Insp. | | I | | I | | |
| | : | | | | | | |
| 6 | Pump | I | I | I | I | I | |
| | Fan | | | | | | |
| | Insp. | I | | I | | | |
| | : | | | | | | |
| 7 | Pump | I | I | I | I | I | |
| | Fan | | | | | | |
| | Insp. | | | I | | I | |
| | : | | | | | | |
| 8 | Pump | | I | I | I | I | I |
| | Fan | | | | | | |
| | Insp. | | I | | I | | |
| | : | | | | | | |
| 9 | Pump | | I | I | I | I | I |
| | Fan | | | | | | |
| | Insp. | | | I | | I | |
| | : | | | | | | |
| 10 | Pump | | I | I | I | I | I |
| | Fan | | | | | | |
| | Insp. | | I | | I | | |
| | : | | | | | | |
| 11 | Pump | I | I | I | I | I | |
| | Fan | | | | | | |
| | Insp. | I | | I | | | |
| | : | | | | | | |
| 12 | Pump | | I | I | I | I | |
| | Fan | | | | | | |
| | Insp. | | I | | I | | |
| | : | | | | | | |

Insp: inspection hole
I: inspected

If in the course of everyday inspections, inspection items are deleted from or inserted into the operating standards data, or inspection time and inspection period data are added or revised, then the procedure returns to the fourth step, and the overall inspection is performed as appropriate.

Also, a yearly autonomous maintenance inspection plan can be produced by inserting the resulting operating standards data into a processing device.

(6) Sixth step (standardization):

In the sixth step of the present example, the machinery component defect data 3 produced for each operator is compiled with the help of the production technology department, the maintenance and management department, the quality control department, and the facility design department, and standardized data for all these departments are produced.

Based on the operating standards data, the production technology department revises the standards and benchmarks for product quality and for keeping up the precision of tools and dies. At the maintenance and management department, an autonomous maintenance system with the purpose of keeping up the precision of the equipment is implemented. At the quality control department, a system is implemented, with which the causes of defects can be discovered and acknowledged, and irregularities in the product quality can be discovered and controlled. At the facility design department, initial-phase equipment management activities are rolled out, and stable operation of the production machinery is secured at an early stage after setting up the equipment.

(7) Seventh step (relentless pursuit of autonomous management):

The seventh step of the present example comprises implementation of specific measures and drawing up schedules as well as repeated production operations based on the standardized data, upon consideration of the strategy of the company and the plant, as well as its yearly plan and target.

The standardized data produced at the sixth step is revised as necessary with reference to production efficiency or the like.

As explained above, with the present invention, forced deterioration of equipment is changed into natural deterioration, and by extending the service life of machinery components, preventing or suppressing the deterioration of machinery components or restoring the same, it is possible to improve the level of product quality assurance.

Moreover, a cost reduction can be achieved by reducing the work hours necessary for maintenance and management and thereby reducing the maintenance costs and equipment costs for corporate activities.

Furthermore, in the course of daily maintenance and management in accordance with the present invention, it is possible to confirm the level of knowledge and maintenance skills of each operator, and to perform comprehensive education, advice and training that is appropriate for the level of knowledge and maintenance skills of each operator.

What is claimed is:

1. A maintenance and management method of equipment for production operations, comprising:

obtaining machinery component defect data by inspecting the equipment;

performing countermeasures and inspections based on these data;

obtaining defect frequency data and inspection standards data, classifying the defects of the equipment by importance;

repeating an overall inspection based on the defect frequency data until the defect frequency data of all defect locations have lowered to a standard value or lower;

then, producing operating standards data based on inspection standards data; and performing maintenance and management by individually feeding back the operating standards data to each operator.

* * * * *